United States Patent [19]

Nakata et al.

[11] Patent Number: 4,573,693
[45] Date of Patent: Mar. 4, 1986

[54] DUST BOOT WITH MULTIPLE LAYER CONSTRUCTION OF BELLOWS

[75] Inventors: Rikizo Nakata, Nakashima; Tadaoki Okumoto, Inazawa; Mikio Ukai, Nagoya; Takamasa Suzuki, Konan; Tomoyoshi Yamada, Inazawa, all of Japan

[73] Assignee: Toyoda Gosei Co., Ltd., Nishikasugai, Japan

[21] Appl. No.: 726,465

[22] Filed: Apr. 24, 1985

[30] Foreign Application Priority Data

Apr. 26, 1984 [JP] Japan ................. 59-84679

[51] Int. Cl.$^4$ ............................................. F16J 15/52
[52] U.S. Cl. ........................ 277/212 FB; 277/233; 277/229; 74/18.1; 403/51
[58] Field of Search ..... 277/212 R, 212 FB, 227–229, 277/233; 74/18, 18.1, 18.2; 403/50, 51

[56] References Cited

U.S. PATENT DOCUMENTS

| 1,922,431 | 8/1933 | Geyer | 74/18.1 X |
| 3,114,568 | 12/1963 | Buono | 74/18.2 X |
| 4,086,819 | 5/1978 | Brownlee | 74/18.2 |
| 4,253,675 | 3/1981 | Laurent | 277/212 FB X |

FOREIGN PATENT DOCUMENTS

| 802297 | 2/1951 | Fed. Rep. of Germany | 403/50 |
| 573732 | 12/1945 | United Kingdom | 403/51 |
| 2031530 | 4/1980 | United Kingdom | 277/212 FB |

*Primary Examiner*—Robert S. Ward
*Attorney, Agent, or Firm*—Cushman, Darby & Cushman

[57] ABSTRACT

A dust boot for a constant velocity universal joint has a bellows-shaped boot made of chloroprene-rubber substantially excluding wax and a polyamide resin coating layer having excellent wear resistance, which is formed on the outer surface of the bellows-shaped boot without peeling. Between the coating layer and the polyamide resin boot is formed a primer layer made of a mixture of chloroprene-rubber and isocyanate compound so that the coating layer does not peel off from the bellow-shaped boot.

5 Claims, 2 Drawing Figures

DUST BOOT WITH MULTIPLE LAYER CONSTRUCTION OF BELLOWS

BACKGROUND OF THE INVENTION

1. Field of the Invention

The present invention relates to a dust boot for a constant velocity universal joint.

2. Description of the Prior Art

The constant velocity universal joint is used to transmit the rotating power from one joint member to the other joint member so as to rotate at a constant velocity while allowing the above two joint members to freely deflect the axial center lines thereof from each other within a predetermined angle range.

When the above described constant velocity universal joint is used in a drive system or the like of a vehicle, the joint portion of the constant velocity universal joint is covered with a dust boot made of rubber. The dust boot generally has a deformable shape such as bellows. One open end of the dust boot is fit on the outer periphery of one joint member while the other open end thereof is fit on the outer periphery of the other joint member.

In the dust boot of this type, adjacent folds locally come in contact with one another when the constant velocity universal joint rotates at a high velocity with a large joint angle. As a result, wear occurs in the dust boot to shorten the life of the dust boot. In order to overcome the defect of the dust boot, wax is included in rubber material of the dust boot to smooth the outer surface of the dust boot. However, satisfactory effect to the above wear cannot be obtained.

SUMMARY OF THE INVENTION

It is an object of the present invention to provide a dust boot for a constant velocity universal joint, which has improved wear resistance and excellent durability.

The dust boot for a constant velocity universal joint, of the present invention has a bellows-shaped boot made of chloroprene-rubber substantially excluding wax and a polyamide resin coating layer having excellent wear resistance, which is formed on the outer surface of the bellows-shaped boot without peeling. Between the coating layer and the polyamide resin boot is formed a primer layer made of a mixture of chloroprene-rubber and isocyanate compound so that the coating layer does not peel off from the bellows-shaped boot.

DETAILED DESCRIPTION OF THE EMBODIMENT

The present invention will be explained in detail in accordance with the embodiment thereof with reference to the accompanying drawings.

Figure 1:
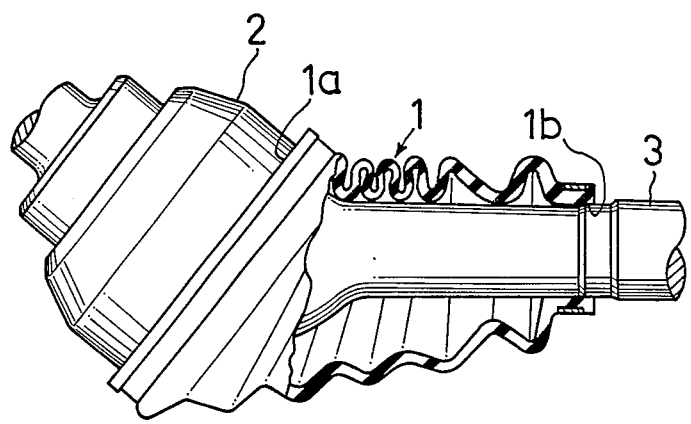
FIG. 1 is a perspective view of a dust boot according to the present invention.
Figure 2:
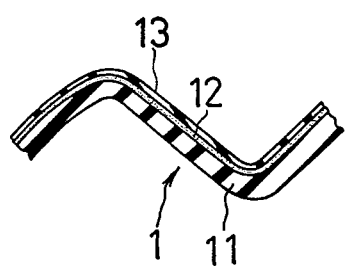
FIG. 2 is a cross section of one part of the bellows portion of the dust boot of FIG. 1.

FIG. 1 is a perspective view of a dust boot according to the present invention.

A bellows-shaped dust boot 1 is composed of a plurality of folds and comprises an open end portion 1a having a larger diameter and an open end portion 1b having a smaller diameter. The open end portion 1a is fit on the outer periphery of a casing 2 acting as one joint member while the open end portion 1b is fit on a shaft 3 acting as the other joint member.

The dust boot 1 is composed of a main body 11 made of chloroprene-rubber as a main constituent, a primer layer 12 and a coating layer 13.

The material of the main body 11 substantially excludes wax. One example of the composition ratio of the material of the main body 11 is as follows:

chloroprene-rubber: 100 (by weight part hereinafter the same)
carbon black: 55
stearic acid: 1
antioxidant: 1
processing aid: 1
magnesium oxide 1
plasticizer: 15
vulcanization accelerator: 1
zinc oxide: 5

On the surface of the main body 11 is applied a primer formed by adding toluene as a solvent to a mixture of chloroprene-rubber and isocyanate compound such as triphenylmethanetriisocyanate, 4-4' diphenylmethane diisocyanate and tolylenediisocyanate or a prepolymer containing the above described isocyanate compound as a main constituent. The preferable mixture ratio of chloroprene-rubber and isocyanate compound is about 100:1–10, especially about 100:3–5.

On the obtained primer layer 12 is formed the coating layer 13 made of polyamid resin. For example, the coating layer 13 is formed by applying a solution containing alcohol-soluble nylon and alcohol as a solvent to the primer layer 12 and drying the applied solution. The obtained coating layer 13 is strongly joined to the main body 11 through the primer layer 12.

When the coating layer 13 is directly formed on the main body 11, the coating layer 13 is apt to peel off from the main body 11.

When wax is included in the material of the main body 11, the coating layer 13 is not strongly joined to the main body 11 despite of the existance of the primer layer 12.

The nylon for forming the coating layer 13 preferably have an elongation of about 100% or more.

When the dust boot is installed at such a position as to be effected by heat of an engine or the like, the nylon preferably have a melting point of 100° C. or more.

Next, the endurance test of the dust boot of the present invention having the above described structure, and the conventional dust boot made of chloroprene rubber containing wax and having no coating layer was performed.

In the above described dust boot according to the present invention, "Platabond M 995" of Nihon Rilsan K.K. was used as the nylon for forming the coating layer 13, and the mixture of 100 g of the same material as that of the main body 11, having the above described composition ratio and 3 g of isocyanate compound ("Desmodur R" of Bayer AG) was used as the primer.

The test conditions were as follows:

temperature of atmosphere: −5° C.
joint angle of the constant velocity joint: 36 deg.
number of revolutions: 380 rpm
grease is packed.

The time taken until leaks were formed in the dust boot due to wear thereof was detected as the endurance life.

The result of the endurance test was that the endurance life of the conventional dust boot was 10 to 15 hours and in contrast, that of the dust boot of the present invention was 55 hours.

As described above, the dust boot for a constant velocity universal joint of the present invention comprises a bellows-shaped boot made of chloroprene-rubber which substantially excluding wax, a primer layer made of a mixture of chloroprene-rubber and isocyanate compound and formed on the surface of the bellows-shaped boot and a coating layer made of polyamide resin and formed on the primer layer. The coating layer is strongly joined to the boot through the primer layer without peeling off from the boot. The coating layer made of polyamide resin is superior in the wear resistance and weather resistance and improves the durability of the dust boot.

What is claimed is:

1. A dust boot for covering a joint portion of a constant velocity universal joint, comprising:
    a bellows-shaped main body made of chloroprene-rubber substantially excluding wax and having one opening end fit on one joint member and the other opening end fit on the other joint member;
    a primer layer made of a mixture of chloroprene-rubber and isocyanate compound and formed on the surface of said main body; and
    a covering layer made of polyamide resin and formed on the surface of said primer layer.

2. A dust boot according to claim 1, wherein the isocyanate compound for making said primer layer is selected from the group consisting of triphenylmethane-triisocyanate, 4-4' diphenylmethane diisocyanate and tolylenediisocyanate.

3. A dust boot according to claim 1, wherein the polyamid resin for making said coating layer is nylon soluble in alcohol.

4. A dust boot according to claim 1, wherein the mixture ratio of chloroprene-rubber and isocyanate compound in the mixture for making said primer layer is 100:1-10.

5. A dust boot according to claim 3, wherein the nylon for making said coating layer has an elongation of 100% or more and a melting point of 100° C. or more.

* * * * *